United States Patent
Le Hors et al.

(10) Patent No.: US 7,349,157 B2
(45) Date of Patent: Mar. 25, 2008

(54) OPTICAL SPLITTING DEVICE AND OPTICAL COMMUNICATION TERMINAL COMPRISING SUCH A DEVICE

(75) Inventors: Lénaïc Alban Le Hors, Toulouse (FR); Thierry Benchetrit, L'Union (FR)

(73) Assignee: EADS Astrium Sas, Toulouse (FR)

( * ) Notice: Subject to any disclaimer, the term of this patent is extended or adjusted under 35 U.S.C. 154(b) by 0 days.

(21) Appl. No.: 11/272,451

(22) Filed: Nov. 10, 2005

(65) Prior Publication Data
US 2006/0114565 A1 Jun. 1, 2006

(30) Foreign Application Priority Data
Nov. 18, 2004 (FR) .................................. 04 12259

(51) Int. Cl.
*G02B 27/28* (2006.01)
(52) U.S. Cl. ...................... 359/495; 359/629
(58) Field of Classification Search ............ None
See application file for complete search history.

(56) References Cited

U.S. PATENT DOCUMENTS

| | | | | |
|---|---|---|---|---|
| 5,082,354 A | * | 1/1992 | Kalmanash | 349/196 |
| 5,694,233 A | * | 12/1997 | Wu et al. | 398/49 |
| 2002/0030866 A1 | * | 3/2002 | Wu et al. | 359/122 |
| 2004/0207919 A1 | * | 10/2004 | Chen et al. | 359/498 |

* cited by examiner

*Primary Examiner*—Arnel Lavarias
(74) *Attorney, Agent, or Firm*—Miller, Matthias & Hull

(57) ABSTRACT

An optical splitting device is intended to receive at an input two beams of different wavelengths. The device includes a polarizing beam splitter designed to selectively transmit part of the beam having one of the wavelengths towards a first output or a second output depending on the polarization of said beam. The device further includes a polarization variation system placed upstream of the polarizing beam splitter. By combining the polarization variation device with the polarizing beam splitter it is possible to adjust the distribution of the energy of a beam between the two outputs of the device. Such a splitting device is advantageously incorporated into an optical communication terminal.

21 Claims, 2 Drawing Sheets

OPTICAL SPLITTING DEVICE AND OPTICAL COMMUNICATION TERMINAL COMPRISING SUCH A DEVICE

The present invention relates to an optical splitting device and to an optical communication terminal comprising such a splitting device.

BACKGROUND OF THE INVENTION

In various optical applications, signals carried by beams having two separate wavelengths are transmitted along parallel directions and received via a common input aperture. These signals must then be processed in two different channels. A first channel is designed to receive the beam associated with one of the wavelengths, and some of the energy of the beam associated with the other wavelength. The second channel is designed to receive the complementary part of the energy of the beam associated with said other wavelength. In other words, the beam having the first wavelength is only intended for the first channel, whereas the beam having the second wavelength is intended for both channels. Furthermore, it is often necessary for the distribution of the energy of the beam having the second wavelength to be able to be adjusted between the two channels.

The free-field optical communication is an example of an application that requires such a distribution of two beams corresponding to different wavelengths. This may for example be optical communication between two satellites, or else between a satellite and a ground or airborne station. As is known, the principle phases of such communication are acquisition, tracking and communication. The acquisition phase consists in directing two optical communication terminals each toward the other. This phase is based on receiving, via each terminal, beacon signals emitted by the other terminal at a first wavelength. Each terminal then receives optical signals emitted by the other terminal at a second wavelength. These signals transmitted at the second wavelength make it possible, on the one hand, to refine the pointing direction of the terminal and, on the other hand, to receive useful data. The refinement of the pointing direction constitutes the tracking phase, and reception of the data corresponds to the communication phase. The tracking and communication phases are generally carried out simultaneously.

Within each terminal, the acquisition and tracking phases are carried out by processing, via a first channel, all the optical signals received, which have the first or the second wavelength. The communication phase is carried out by processing the optical signals received at the second wavelength via a second channel, separate from the first channel.

Hitherto, the fraction of the energy of the signals associated with the second wavelength, which is directed toward the second channel, in other words toward the communication channel, is determined by a semireflective plate placed at the input of the terminal. The distribution of the energy of the signals associated with the second wavelength between the two channels is therefore set during construction of the terminal, and can no longer be adjusted during use of the latter.

Now, if the signals received are of low power or if the terminal is not accurately pointed toward the other terminal, for example when the latter is moving rapidly, it is advantageous to be able to increase the fraction of the energy of the signals associated with the second wavelength which is directed toward the communication channel. Such an adjustment may also be necessary when the transmission conditions between the two terminals vary or are unfavorable.

It is an object of the present invention therefore to provide an optical device for directing signals received at two wavelengths toward two separate channels, with adjustable energy distribution in the case of one of the wavelengths.

SUMMARY OF THE INVENTION

To this end, the invention proposes an optical splitting device designed to receive, as input, two beams at first and second wavelengths respectively, the beam at said second wavelength being polarized, the device comprising:
  a beam input;
  a first beam output and a second beam output that are spatially separate, the system being, for the beam having the first wavelength, substantially transparent between the input and said first output and substantially opaque between the input and said second output;
  a polarizing beam splitter designed to selectively transmit part of the beam having the second wavelength to the first output or the second output depending on the polarization of said beam part; and
  a polarization variation system for varying the polarization of the beam having the second wavelength, said system being placed upstream of the polarizing beam splitter relative to the direction of propagation of the beam within the splitting device.

Thus, in a device according to the invention, the energy of optical signals carried by a beam corresponding to the first wavelength is transmitted in a substantially fixed proportion between the input and the first output. The energy of the optical signals carried by a beam corresponding to the second wavelength is distributed between the two outputs, according to a distribution that is determined by means of the polarization variation system.

The polarization variation system distributes the energy of the beam received at the second wavelength between two components having specified polarization directions. The polarizing beam splitter then directs each of the two components towards the first or second output of the device, while respecting this energy distribution. The polarization therefore constitutes a parameter for splitting the energy of the signals received at the second wavelength between the two outputs of the device. In the jargon of those skilled in the art, the optical splitting device performs a demultiplexing operation on the first and second wavelengths, with an adjustable distribution of the energy associated with the second wavelength.

Within the context of the invention, the term "polarized beam" is understood to mean a beam whose electric field is directed along a specified and constant direction, or else one that rotates in a specified sense. The polarization of the beam is a linear polarization in the first case, and a circular polarization in the second case.

The beam corresponding to the second wavelength, which is received by a splitting device according to the invention, is polarized. This polarization may be obtained by means of a linear or circular polarizer placed at the input of the device. Alternatively, the beam corresponding to the second wavelength may be transmitted directly in polarized form by a beam emitter.

Moreover, a quarter-wave plate, dimensioned for the second wavelength and added at the input of the device, can convert a device designed for a beam having the second wavelength, which is linearly polarized, into a device suitable for a beam having the second wavelength, which is circularly polarized.

The radiation received, which corresponds to the first wavelength, is not necessarily polarized.

A first advantage of a device according to the invention results from the fact that it comprises only a single optical signal input. The number of optical components of the device, its weight and its size are consequently reduced, this being particularly important, especially for a device onboard a satellite. Furthermore, several separate inputs would be needed to ensure parallelism between the pointing directions of each of them, which would make the installation and the use of the device complicated. For this reason, the use of a device according to the invention is therefore particularly simple.

A second advantage of a device according to the invention results from the fact that there are few moving parts, or even no moving parts. This is because only the polarization variation system is likely to include moving parts. This may be the case, in particular, when the polarization variation system comprises a half-wave plate dimensioned for the second wavelength and capable to be oriented about an axis perpendicular to said plate.

Alternatively, the polarization variation system may comprise a Pockels cell connected to a variable electric voltage source. As is known, such a cell is a birefringent electrooptic modulator, the difference between the ordinary and extraordinary refractive indices of which may be modified by applying an electric voltage to the terminals of the module. In this case, the optical splitting device comprises no moving part. It is therefore particularly robust and reliable. In particular, its operation is insensitive to any vibration, friction or inertial resistance.

The polarization variation system may be actuated manually or automatically. In particular, it may be feedback-controlled according to the power of the beam having the second wavelength, which is transmitted to one of the outputs of the device. To do this, the optical splitting device further includes a feedback control system for the polarization variation system, which is designed to receive, as input, a signal representative of the power of the beam having the second wavelength and transmitted to one or other of the outputs of the splitting device.

According to a first embodiment of the invention, the polarization variation system and the polarizing beam splitter are placed between the input and the first output of the device so as to transmit the beam having the first wavelength and emerging from the device via said first output. Such an embodiment employs a particularly small number of optical components.

According to a second embodiment of the invention, the optical splitting device further includes a wavelength splitter designed to transmit a beam having the first wavelength to the first output of the device and to transmit, along an intermediate path, a beam having the second wavelength. The polarization variation system and the polarizing beam splitter are then placed on the intermediate path downstream of the wavelength splitter relative to the direction of propagation of the beam. In this case, the optical splitting device may consist only of relatively simple and inexpensive optical components.

The invention also proposes an optical communication terminal that includes a splitting device as described above, in which the first and second outputs of the device are optically connected to an optical-signal acquisition/tracking channel of a remote terminal and to an optical-signal receive channel, respectively. Such a terminal benefits from an adjustable distribution of the energy of the signals received at the second wavelength between the acquisition/tracking channel on the one hand, and the communication channel on the other. This makes it possible to adapt the sensitivity of the terminal according to the signal reception conditions. In particular, its sensitivity may be modified in real time during operation of the terminal.

The terminal may further include an asymmetric mirror placed at the input of the splitting device so that an optical signal transmitted by the terminal exits via said input.

DETAILED DESCRIPTION OF THE INVENTION

Figure 1:
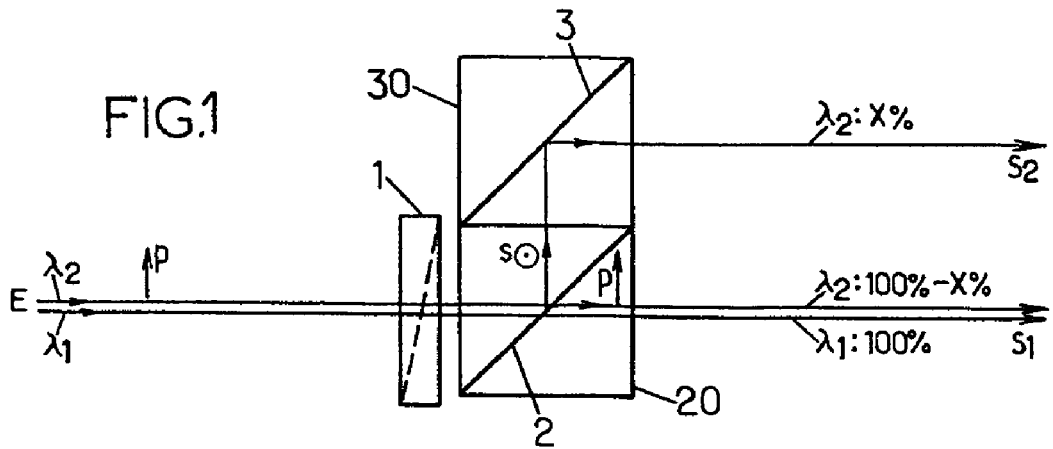
FIG. 1 is an optical diagram of a splitting device according to the first embodiment of the invention.
Figure 3:
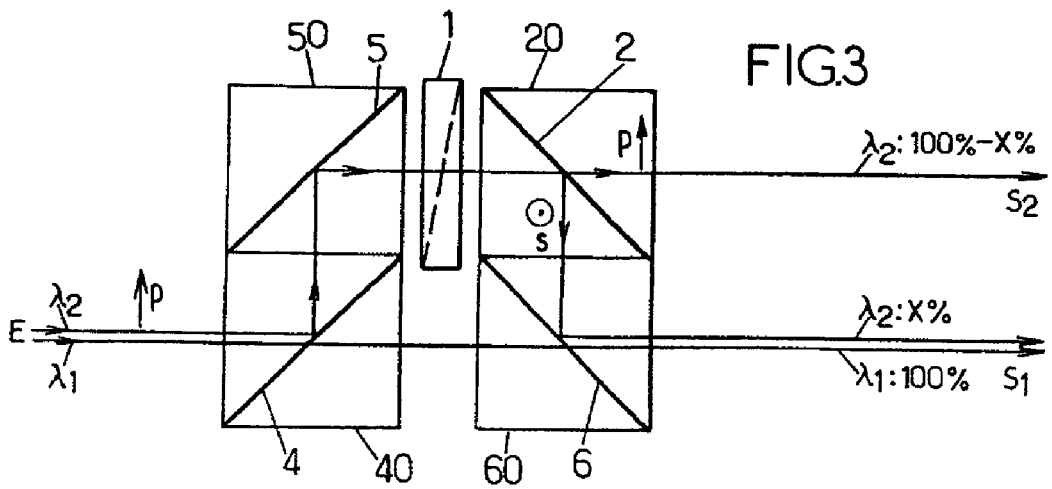
FIG. 3 is an optical diagram of a splitting device according to the second embodiment of the invention.
Figure 5:
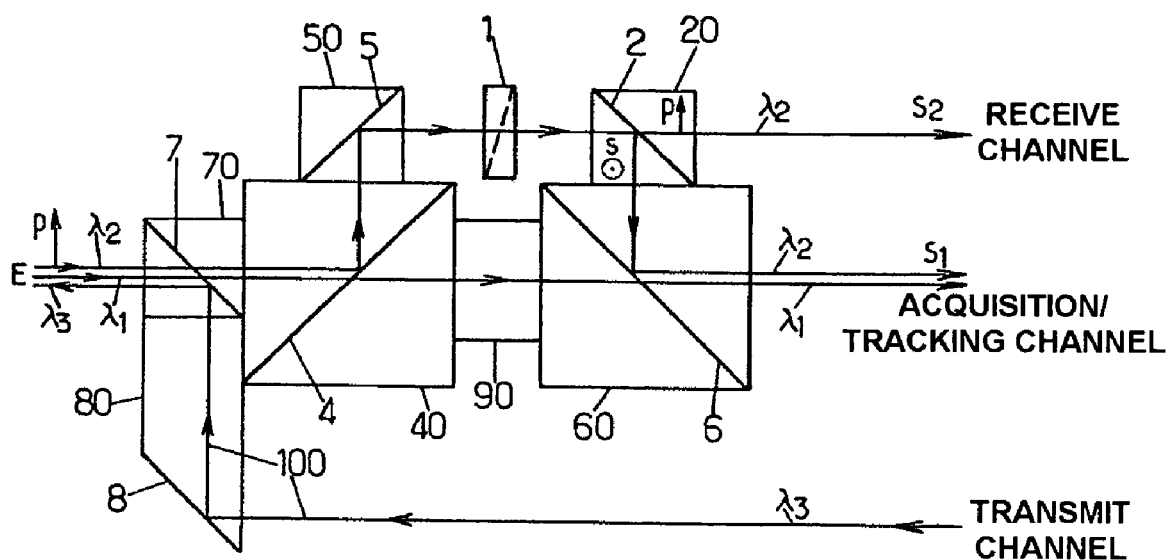
FIG. 5 is an optical diagram of a communication terminal that includes a splitting device according to the second embodiment of the invention.

For the sake of clarity of the figures, the dimensions of the elements shown have not been drawn to scale. Furthermore, identical references in the various figures denote identical elements, or elements that have identical functions. In FIGS. 1, 3 and 5, s and p denote linear polarization directions of the beam that are perpendicular and parallel, respectively, to the plane of these figures.

As shown in FIG. 1, an optical splitting device comprises an optical signal input E and a first optical signal output S1 that define the aiming direction of the device. A polarization variation system 1 and a polarizing beam splitter 2 are placed between the input E and the output S1.

The polarization variation system 1 and the polarizing beam splitter 2 are substantially transparent at a first wavelength, denoted by $\lambda_1$. The term "substantially transparent" is understood to mean the capability of an optical component to transmit a predominant fraction of the energy of a beam. This fraction is approximately constant for the polarization variation system 1 and the polarizing beam splitter 2 for a beam at the wavelength $\lambda_1$. In relation to a beam at the wavelength $\lambda_1$, this fraction is arbitrarily 100% in the figure.

The polarization variation system 1 may consist of a half-wave plate designed to introduce a retardation of one half-period between two linear polarization components of a beam having a wavelength $\lambda_2$. Such an effect of a half-wave plate is assumed to be known and will not be discussed here. The half-wave plate is mounted so as to be able to rotate about the axis of the device that connects the input E to the output S1. It may be rotated about this axis by a motor so as to modify the orientation of its optical axes relative to the polarizing beam splitter 2.

Figure 2:
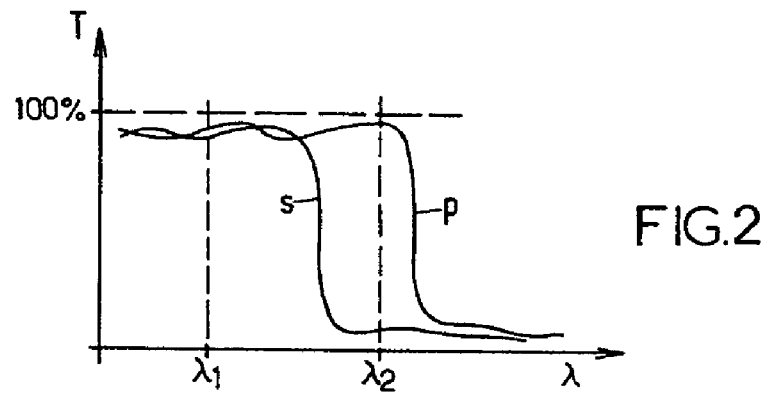
FIG. 2 is a diagram of the transmission of a polarizing beam splitter that can be used in a device according to FIG. 1.

The polarizing beam splitter 2 comprises a dichroic polarizing plate, the transmission (T) characteristic of which is reproduced in FIG. 2 as a function of the wavelength $\lambda$. Such a splitter is designed to be used at a specified angle of incidence of the beam, for example 45°. It possesses two different transmission characteristics, for the s and p polarizations of the beam respectively. In the case of the s polarization, the dichroic polarizing plate possesses an upper transparency limit which is located between the wavelengths $\lambda_1$ and $\lambda_2$. In the example in question, $\lambda_1$ is shorter than $\lambda_2$. In respect of the p polarization, the dichroic polarizing plate possesses an upper transparency limit that is located beyond the wavelength $\lambda_2$. The plate is therefore substantially transparent for radiation of wavelength $\lambda_1$, and also for a beam of wavelength $\lambda_2$ having the p polarization. In contrast, it is reflective for a beam of wavelength $\lambda_2$ having the s polarization. Such a dichroic polarizing plate usually consists of a multilayer stack, the overall reflection of which depends on the wavelength and on the polarization of the beam. This stack is adjusted according to the desired transparency thresholds and the angle of use of the plate.

A deflection mirror 3 (FIG. 1) is also provided between the polarizing beam splitting system 2 and the output S2 so that the directions along which the beam emerges via the outputs S1 and S2 of the device are mutually parallel.

Preferably, the dichroic polarizing plate of the polarizing beam splitter 2 and the deflection mirror 3 are fixedly placed approximately parallel to each other. The parallelism between the directions along which the beam emerges via the outputs S1 and S2 is therefore unaffected by any unintentional rotation of the assembly comprising the polarizing beam splitter 2 and the deflection mirror 3 in the plane of FIG. 1. Nor is this parallelism affected by a translation of the same assembly along any direction. Advantageously, the dichroic polarizing plate of the polarizing beam splitter 2 and the deflection mirror 3 are placed within respective contiguous transparent blocks with the references 20 and 30. The blocks 20 and 30 have shapes such that the exit faces via which the beam emerges from the blocks 20 and 30 are parallel to the entrance face where the beam enters the block 20. The blocks 20 and 30 are cemented to each other by means of a transparent cement or by molecular adhesion, so that they are integral. Such a construction of the optical splitting device guarantees that the directions of emergence of the beams at the outputs S1 and S2 remain approximately parallel to the direction of incidence of the beams at the input E, whatever the rotation or the translational shift of the assembly comprising the blocks 20 and 30.

The operation of such an optical splitting device will now be described.

A beam of wavelength $\lambda_1$ is transmitted between the input E and the output S1 without being significantly affected.

The beam of wavelength $\lambda_2$ that is received at the input E possesses the p initial polarization. If it has a circular initial polarization, this is converted into a linear p polarization by adding a quarter-wave plate at the input E of the device, this plate being dimensioned for the wavelength $\lambda_2$. Such a quarter-wave plate must be substantially transparent for the beam of wavelength $\lambda_1$.

As is known, the half-wave plate 1 makes the polarization direction of the incident beam of wavelength $\lambda_2$ rotate through an angle equal to twice the angular difference between the p polarization direction and the neutral axis of the half-wave plate. Some of the energy corresponding to the wavelength $\lambda_2$ is then associated with the s polarization. This is denoted in FIG. 1 by X %. The complementary part of the energy of the incident radiation corresponding to the wavelength $\lambda_2$, denoted by 100%-X %, remains associated with the p polarization. The energy part associated with the s polarization is reflected by the dichroic polarizing plate 2 and by the deflection mirror 3 in the direction of the output S2. Simultaneously, the energy part associated with the p polarization is transmitted directly by the dichroic polarizing plate 2 in the direction of the output S1. The distribution of the incident energy corresponding to the wavelength $\lambda_2$ between the two outputs S1 and S2 (respectively, 100%-X % and X %) may be varied by rotating the dichroic polarizing plate 2.

A second embodiment of an optical splitting device according to the invention will now be described with reference to FIG. 3. The input E and the outputs S1 and S2 of the device are arranged in a similar manner to that of the first embodiment described above.

A wavelength splitter 4 is placed between the input E and the output S1. It is transparent for a beam of wavelength $\lambda_1$ and reflective for a beam of wavelength $\lambda_2$. Such a wavelength splitter 4 may comprise a wavelength-selective mirror that possesses a spectral reflection threshold located between the wavelengths $\lambda_1$ and $\lambda_2$. It may have a structure similar to that of a dichroic polarizing plate, such as that described above, by adapting the materials and the thicknesses of the layers of the multilayer stack. The splitter 4 reflects the beam of wavelength $\lambda_2$ along an intermediate optical path that is spatially separate from the path followed by the beam of wavelength $\lambda_1$.

A deflection mirror 5 is placed in this intermediate path, between the wavelength splitter 4 and a polarization variation system 1. It is oriented so as to direct the beam having the wavelength $\lambda_2$ towards the polarization variation system 1.

Advantageously, the deflection mirror 5 comprises a polarizing mirror designed to selectively reflect a beam having the wavelength $\lambda_2$ and the p polarization towards the polarization variation system 1. Thus, the mirror is transparent for a beam of s polarization and wavelength $\lambda_2$, which helps to eliminate any noise in the incident beam at the wavelength $\lambda_2$ that would not have the p polarization.

In the same way as described within the context of the first embodiment of the invention, it is advantageous for the wavelength-selective mirror 4 and the deflection mirror 5 to be fixedly placed approximately parallel to each other.

The polarization variation system 1 may also consist of a half-wave plate dimensioned for the wavelength $\lambda_2$ and able to rotate.

The polarizing beam splitter 2 is placed in the intermediate path after the polarization variation system 1. It may itself comprise a polarizing mirror. In particular, it may be identical to the deflection mirror 5.

Finally, a complementary mirror 6 is advantageously placed so as to reflect the beam transmitted by the polarizing beam splitter 2 towards the output S1 along a direction of emergence via the output S1 that is common with the beam having the wavelength $\lambda_1$ transmitted by the device. Preferably, the polarizing mirror of the polarizing beam splitter 2 and the complementary mirror 6 are fixedly placed approximately parallel to each other.

The mirror of the wavelength splitter 4 and the deflection mirror 5 may be placed within first respective contiguous transparent blocks, with the references 40 and 50. The blocks 40 and 50 have shapes such that the exit faces via which the beam emerges from these first blocks are parallel to the entrance face where the beam enters the block 40.

Likewise, the polarizing mirror of the polarizing beam splitter 2 and the complementary mirror 6 may be placed within second respective contiguous transparent blocks, with the references 20 and 60. The blocks 20 and 60 have shapes such that the exit faces via which the beam emerges from these second blocks are parallel to the entrance face where the beam enters the block 20.

The operation of an optical splitting device according to FIG. 3 is as follows.

The beam of wavelength $\lambda_1$ is again transmitted directly between the input E and the output S1.

The beam of wavelength $\lambda_2$ received at the input E is reflected by the mirror 4 towards the deflection mirror 5 and then reflected by the latter in the direction of the half-wave plate 1.

The half-wave plate 1 then rotates the linear polarization direction of the beam of wavelength $\lambda_2$. The beam of wavelength $\lambda_2$ thus acquires an s polarization component. This component (denoted by X %) is reflected by the polarizing mirror of the polarizing beam splitter 2, whereas the complementary p polarization component (denoted by 100%-X %) is transmitted towards the output S2. Finally, the complementary mirror 6 directs the s polarization component towards the output S1. The output S1 therefore conducts the s component of the beam of wavelength $\lambda_2$ and the beam of wavelength $\lambda_1$.

The distribution X %/100%-X % of the incident energy corresponding to the wavelength $\lambda_2$ between the outputs S1 and S2 may also be varied by rotating the half-wave plate 1 relative to the polarizing beam splitter 2.

In the same way as in the case of the first embodiment, a quarter-wave plate may be added at the input E of the device, in order for the latter to operate with a circularly polarized beam of wavelength $\lambda_2$.

Figure 4:
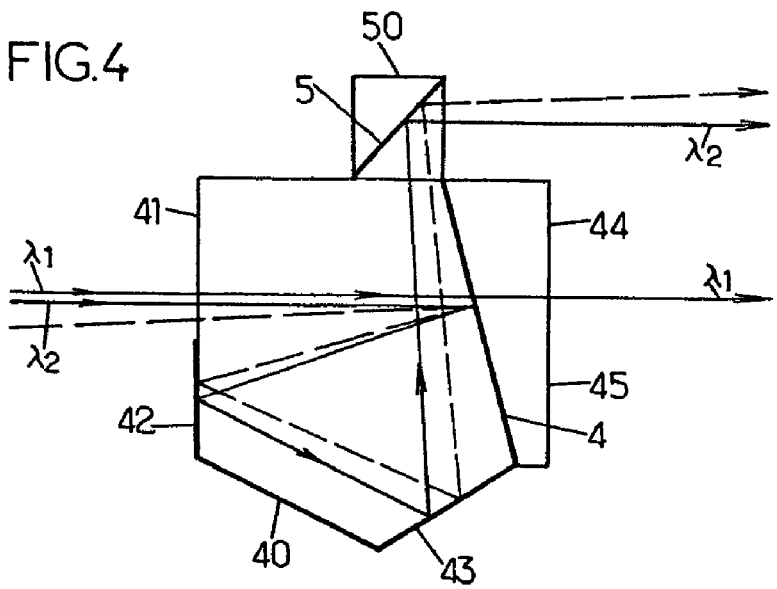
FIG. 4 illustrates a variant of the second embodiment of the invention.

FIG. 4 is an example of an arrangement of the mirror of the wavelength splitter 4 within a transparent block 40 having a different shape. Apart from the face bearing the wavelength-selective mirror 4, the block 40 has an entrance face 41 provided with an antireflection treatment effective for both beams, of wavelength $\lambda_1$ and $\lambda_2$. It also includes two other faces 42 and 43 made reflective by metallization and oriented so as to reflect the beam of wavelength $\lambda_2$ inside the block 40. In the example shown, the entrance face 41 and the reflective face 42 are in mutual alignment. The transparent block 50 of the deflection mirror 5 is shown by way of indication. A compensation block 44 is placed against that face of the block 40 which bears the mirror of the wavelength splitter 4, so as to provide an exit face 45 for the beam of wavelength $\lambda_1$, which exit face 45 is parallel to the entrance face 41. The path indicated by dashed lines corresponds to an angularly offset direction of incidence. As may be seen in the figure, the directions of emergence of the beams are consequently offset, but they remain parallel to the corresponding direction of incidence.

One advantage of an arrangement as shown in FIG. 4 lies in the use of the wavelength-splitting mirror 4 with a low angle of incidence, which may especially be less than 45°. This is because a low value of the angle of incidence of the beam on the mirror 4 may be more appropriate in certain circumstances.

Transparent blocks having suitable shapes for generating a specified number of internal reflections are known and may be used for all the reflective or partially reflective optical components employed within the context of the invention. They are joined together by cementing or by molecular adhesion. Two blocks joined together in this way must have identical refractive indices, especially in order to eliminate any loss of beam energy caused by a reflection occurring at the interface between the two blocks.

FIG. 5 illustrates an arrangement of a splitting device according to the second embodiment, which is suitable for an optical communication terminal. An additional path 100 is provided, this being intended for the transmission of signals produced by said terminal at the wavelength $\lambda_3$. This transmission path 100 is connected to the input E of the splitting device via two mirrors 7 and 8. The mirror 7 is asymmetric—it is designed to transmit all the signals received coming from the input E, and to reflect towards the input E the received signals coming from the mirror 8. The mirror 8 may be a simple deflection mirror. The mirrors 7 and 8 may be placed within respective transparent blocks 70 and 80. The output S1 is optically connected to an acquisition/tracking channel of the terminal, the output S2 is optically connected to a channel for decoding received optical signals, and the transmission path 100 is connected to a channel for the production of optical signals of wavelength $\lambda_3$ that are intended to be transmitted.

An intermediate transparent block 90 is placed between the blocks 40 and 60 in order to establish index continuity for the received beam of wavelength $\lambda_1$. The blocks 20-90 are rigidly coupled to one another. An optical communication terminal equipped with such a splitter is particularly compact and robust, and virtually insensitive to any error in the positioning of the splitter by rotation or translation thereof.

Advantageously, the half-wave plate 1 is feedback-controlled in terms of rotation according to the power level of the beam of wavelength $\lambda_2$ that is transmitted to the decoding channel via the output S2. Such feedback control helps to obtain reliable communication between the terminal and a partner terminal.

It will be understood that many modifications and adaptations may be made to the optical splitting devices that have been described in detail, depending on the application for which such devices are intended. In particular, the half-wave plate of each device, operational at the second wavelength, may be replaced with a Pockels cell. Finally, such optical splitting devices may be designed to operate with beams in the visible or infrared.

The invention claimed is:

1. An optical communication splitting device designed to receive, as input, two beams at first and second wavelengths respectively, the beam at said second wavelength being polarized, the device comprising:
    a beam input;
    a first beam output and a second beam output that are spatially separate, the system being, for the beam having the first wavelength, substantially transparent between the input and said first output and substantially opaque between the input and said second output;
    a polarizing beam splitter designed to selectively transmit part of the beam having the second wavelength to the first output or the second output depending on the polarization of said beam part; and
    a polarization variation system for varying the polarization of the beam having the second wavelength, said system being placed upstream of the polarizing beam splitter relative to the direction of propagation of the beam within the splitting device, said device being arranged so that an energy distribution of the beam having a second wavelength can be varied between the first beam output and the second beam output by adjusting the polarization variation system, while a substantially fixed part of the beam having the first wavelength is being transmitted between the beam input and the first beam output, wherein the distribution of the energy of the second beam component pertaining to the second spectral range can be set continuously between both output ports.

2. Device according to claim 1, wherein the polarization variation system comprises a half-wave plate dimensioned for the second wavelength and capable to be oriented about an axis perpendicular to said plate, or a Pockels cell connected to a variable electric voltage source.

3. Device according to claim 1, which further includes a feedback control system for the polarization variation system, designed to receive, as input, a signal representative of the power of the beam having the second wavelength and transmitted to one or other of the outputs of the splitting device.

4. Device according to claim 1, which further includes a quarter-wave plate dimensioned for the second wavelength and placed at the input of the device.

5. Device according to claim 1, wherein the polarization variation system and the polarization beam splitter are placed between the input and the first output of the device so as to transmit the beam having the first wavelength and emerging from the device via said first output.

6. Device according to claim 5, wherein the polarizing beam splitter comprises a dichroic polarizing plate.

7. Device according to claim 6, which further includes a deflection mirror placed between the polarization splitting system and the second output of the device, so that the directions in which the beams emerge via the first and second outputs of the device are parallel.

8. Device according to claim 7, wherein the dichroic polarizing plate and the deflection mirror are fixedly placed approximately parallel to each other.

9. Device according to claim 8, wherein the dichroic polarizing plate and the deflection mirror are placed within respective contiguous transparent blocks having shapes such that exit faces via which the beam emerges from said blocks are parallel to an entrance face where the beam enters the block of the dichroic polarizing plate.

10. Device according to claim 1, which further includes:
a wavelength splitter designed to transmit, to the first output of the device, a beam having the first wavelength and to transmit, along an intermediate path, a beam having the second wavelength, the polarization variation system and the polarizing beam splitter being placed on the intermediate path downstream of the wavelength splitter relative to the direction of propagation of the beam along said intermediate path.

11. Device according to claim 10, wherein the wavelength splitter comprises a wavelength-selective mirror having a spectral reflection threshold located between the first wavelength and the second wavelength.

12. Device according to claim 10, which further includes a deflection mirror placed in the intermediate path between the wavelength splitter and the polarization variation system, oriented so as to direct the beam having the second wavelength towards the polarization variation system.

13. Device according to claim 12, wherein the deflection mirror comprises a polarizing mirror designed to selectively reflect a beam having the second wavelength and a specified polarization towards the polarization variation system.

14. Device according to claim 11, which further includes a deflection mirror placed in the intermediate path between the wavelength splitter and the polarization variation system, oriented so as to direct the beam having the second wavelength towards the polarization variation system, and wherein the wavelength-selective mirror and the deflection mirror are fixedly placed approximately parallel to each other.

15. Device according to claim 14, wherein the wavelength-selective mirror and the deflection mirror are placed within first respective contiguous transparent blocks having shapes such that exit faces via which the beam emerges from said first blocks are parallel to an entrance face where the beam enters the first block of the wavelength-selective mirror.

16. Device according to claim 10, wherein the polarizing beam splitter itself comprises a polarizing mirror.

17. Device according to claim 16, which further includes a complementary mirror placed so as to reflect the transmitted beam towards the first output via the polarizing beam splitter, in a exit direction via said first output common with the beam transmitted by the device having the first wavelength.

18. Device according to claim 17, wherein the polarizing mirror of the polarizing beam splitter and the complementary mirror are fixedly placed approximately parallel to each other.

19. Device according to claim 18, wherein the polarizing mirror of the polarizing beam splitter and the complementary mirror are placed within second respective contiguous transparent blocks having shapes such that the exit faces via which the beam emerges from said second blocks are parallel to an entrance face where the beam enters the second block of the polarizing mirror of the polarizing beam splitter.

20. Optical communication terminal comprising a splitting device according to claim 1, wherein the first and second outputs of the device are optically connected to an optical-signal acquisition/tracking channel of a remote terminal and to an optical-signal receive channel, respectively.

21. Terminal according to claim 20, which further includes an asymmetric mirror placed at the input of the splitting device so that an optical signal transmitted by the final exits via said input.

* * * * *